United States Patent
Klippel et al.

(10) Patent No.: US 8,459,624 B2
(45) Date of Patent: Jun. 11, 2013

(54) CLAMP HEAD

(75) Inventors: Simon Francis Klippel, Knaresborough (GB); Neil Frank Gill, Shipley (GB); Mark Gaskell, Bradford (GB); Louise Caroline Foster, Castleford (GB)

(73) Assignee: EV IP LP, Dover, DE (US)

( * ) Notice: Subject to any disclaimer, the term of this patent is extended or adjusted under 35 U.S.C. 154(b) by 387 days.

(21) Appl. No.: 12/205,782

(22) Filed: Sep. 5, 2008

(65) Prior Publication Data
US 2009/0051093 A1 Feb. 26, 2009

Related U.S. Application Data

(63) Continuation of application No. 12/014,738, filed on Jan. 15, 2008, now abandoned.

(51) Int. Cl.
*B25B 1/06* (2006.01)
*B25B 1/16* (2006.01)
*B23Q 3/02* (2006.01)
*F16B 7/08* (2006.01)
*F16B 9/00* (2006.01)
*E01B 9/00* (2006.01)
*E01B 13/00* (2006.01)
*E01B 21/04* (2006.01)
*E01B 29/24* (2006.01)

(52) U.S. Cl.
USPC ............ 269/216; 269/92; 269/94; 403/168; 238/349

(58) Field of Classification Search
USPC ............ 269/216, 92, 94; 403/168, 338, 256; 238/349, 301, 298, 315
See application file for complete search history.

(56) References Cited

U.S. PATENT DOCUMENTS

| | | | | |
|---|---|---|---|---|
| 2,175,453 | A * | 10/1939 | Barcy | 403/256 |
| 3,338,520 | A * | 8/1967 | Dinger | 238/349 |
| 3,552,649 | A * | 1/1971 | Burwell | 238/310 |
| 4,289,059 | A | 9/1981 | Alderton | |
| 4,432,538 | A * | 2/1984 | Sequin | 269/92 |
| 4,819,869 | A * | 4/1989 | Matlock | 238/298 |
| 5,096,118 | A * | 3/1992 | Matlock | 238/298 |
| 5,451,116 | A * | 9/1995 | Czachor et al. | 403/338 |
| 6,010,121 | A * | 1/2000 | Lee | 269/94 |
| 6,450,415 | B1 * | 9/2002 | Kirchner et al. | 238/315 |
| 7,021,855 | B2 * | 4/2006 | Hardtke et al. | 403/168 |
| D597,393 | S * | 8/2009 | Klippel et al. | D8/72 |
| 2002/0182003 | A1 | 12/2002 | Hardtke | |

FOREIGN PATENT DOCUMENTS

| | | |
|---|---|---|
| DE | 2106 205 | 8/1972 |
| DE | 92 07 874.5 | 10/1992 |

(Continued)

*Primary Examiner* — Lee E Wilson
*Assistant Examiner* — Alvin Grant
(74) *Attorney, Agent, or Firm* — Todd E. Garabedian; Wiggin and Dana LLP

(57) ABSTRACT

The present invention provides clamp head comprising an arched body having upper and lower faces, a vertex and opposing unequal length arms. The body is further provided with a through aperture for a bolt or like threaded fastener which extends between the upper and lower faces in the region of the vertex. The aperture in the upper face is oval and tapers outwardly through the body in the direction of the lower face. The arms comprise a reaction arm having at its distal end a reaction face and a clamping arm having at its distal end a clamping face, the reaction and clamping faces being provided with respective formations. The formations of the reaction arm extend in a direction which is substantially transverse to the direction of the formations of the clamping arm.

19 Claims, 8 Drawing Sheets

FOREIGN PATENT DOCUMENTS

| DE | 201 14 346 | 11/2002 |
| EP | 0 431 209 A1 | 6/1991 |
| EP | 1 249 621 A2 | 10/2002 |
| GB | 483121 | 4/1938 |
| GB | 2 042 617 | 9/1980 |

* cited by examiner

CLAMP HEAD

CROSS REFERENCE TO RELATED APPLICATIONS

This application is a continuation of U.S. patent application Ser. No. 12/014,738, filed Jan. 15, 2008, which claims the benefit of priority to Great Britain Patent Application Number 0700818.8 which was filed on Jan. 16, 2007, each of which is incorporated by reference in its entirety.

BRIEF SUMMARY OF THE INVENTION

The present invention relates to a clamp head and particularly to a clamp head suitable for incorporation in a clamp for structural steelwork.

Clamp arrangements including a nut and bolt, and at least one shaped clamp head are utilised to attach items to a structural steelwork element, or to connect two structural steel work elements to one another. Typically, the distance from an engagement surface of the clamp head to a reference plane must be measured or calculated, and the size of the clamp head chosen must be able to accommodate the desired distance. Failure to correctly calculate or measure the distance, or to ignore this requirement in its entirety, can lead to the use of a clamp head, clamp or clamp and packer combination which is not suitable for the job in hand.

According to a first aspect of the present invention there is provided a clamp head comprising an arched body having upper and lower faces, a vertex and opposing unequal length arms, the body further having a through aperture for a bolt or like threaded fastener extending between the upper and lower faces in the region of the vertex, the aperture in the upper face being oval and tapering outwardly through the body in the direction of the lower face, wherein the arms comprise a reaction arm having at its distal end a reaction portion and a clamping arm having at its distal end a clamping portion, the reaction and clamping portions being provided with respective formations, and wherein the formations of the reaction arm extend in a direction which is substantially transverse to the direction of the formations of the clamping arm.

In a preferred embodiment, the formations of the reaction arm may extend in a direction substantially perpendicular to the direction of the formations of the clamping arm. The formations of the reaction arm may extend in a direction substantially transverse to a longitudinal axis of the clamp head. The formations of the clamping arm may extend in a direction substantially parallel to a longitudinal axis of the clamp head.

The reaction portion, in use, rests against a reaction surface, while the clamping portion rests against a clamping surface. In a preferred embodiment, the reaction arm is longer than the clamping arm. The reaction arm may preferably widen in the direction of the distal end of the reaction arm. The clamping arm may preferably narrow in the direction of the distal end of the clamping arm. In a preferred embodiment the reaction arm widens in the direction of the distal end of the reaction arm and the clamping arm narrows in the direction of the distal end of the clamping arm. In such an embodiment the distal end of the clamping arm is narrower than the distal end of the reaction arm.

The formations of the reaction arm may, for example, comprise at least one ridge and at least one trough which extend across the reaction portion of the reaction arm from one side of the reaction arm to the other. The reaction arm may be provided with a plurality of ridges and troughs. The reaction portion of the reaction arm is preferably rounded and the plurality of ridges and troughs are spaced around this rounded face. In use, the clamp head may be pivoted about the reaction portion, for example to accommodate clamping surfaces of differing heights. By spacing the ridges and troughs around the rounded reaction portion, it will be appreciated that at least one ridge will remain in contact with the reaction surface as the clamp head is pivoted in this manner.

The formations of the clamping arm may, for example, comprise a plurality of teeth, interruptions, abutments, raised facets, crowns or the like which are spaced across the distal end of the clamping arm.

The upper surface of the body may be adapted to capture the flat sides of a nut or bolt head to prevent rotation thereof. In such an embodiment, the upper face of the arched body in the region of the vertex and through aperture may be provided with abutments against which the flat sides of a nut or bolt head can, in use, engage. In addition to said abutments, the upper face of the arched body may be recessed between said abutments.

According to a second aspect of the present invention there is provided a clamp arrangement including a clamp head according to the first aspect, the clamp arrangement having an elongate threaded fastener such as a nut and bolt extending through the through aperture of the or each clamp head.

The clamp arrangement may include a further clamp head according to the first aspect, said further clamp head being provided on the elongate threaded fastener and opposing the first clamp head.

DESCRIPTION OF THE DRAWINGS

An embodiment of the present invention will now be described with reference to the accompanying drawings in which.

DETAILED DESCRIPTION OF THE INVENTION

Figure 1:
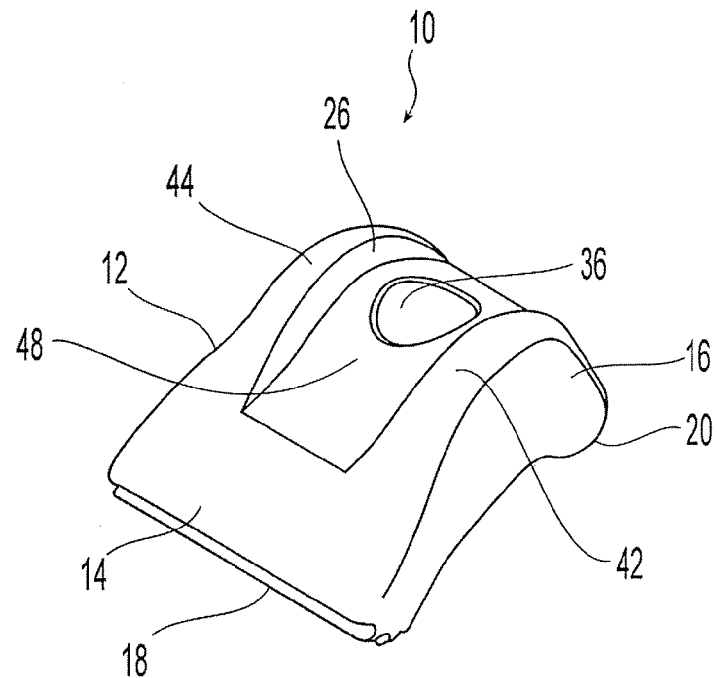
FIG. 1 shows a perspective view of a clamp head according to the present invention.

Referring to the figures, there is shown a clamp head generally designated 10. The clamp head 10 is of a unitary construction comprising a shaped body 12. The body 12 is preferably manufactured from metal and is formed by a casting, forging or pressing method. As can be seen from the side views, the body 12 has a generally arched shape having two arms 14,16 of unequal length. The longer arm 14 may be termed the reaction arm and the shorter arm 16 the clamping arm. The basis for this terminology is described in greater detail below. As can be further be seen from the side views, the body 12 is at its thickest at the vertex 26 of the arch and at its thinnest at the distal ends 18,20 of the arms 14,16. The body 12 may be considered to have an upper side or face 28 and a lower side or face 30. The radius of curvature of the vertex 26 on both the upper and lower sides 28,30 of the body 12 is greater than the respective radii of curvature of the distal ends 18,20 of the arms 14,16.

The top and bottom plan views show that the body 12 has a generally tapered shape which is at its widest at the distal end 18 of the reaction arm 14, and at its narrowest at the opposing distal end 20 of the clamping arm 16. The aforementioned distal ends 18,20 of the arms 14,16 are substantially parallel to one another.

Figure 9:
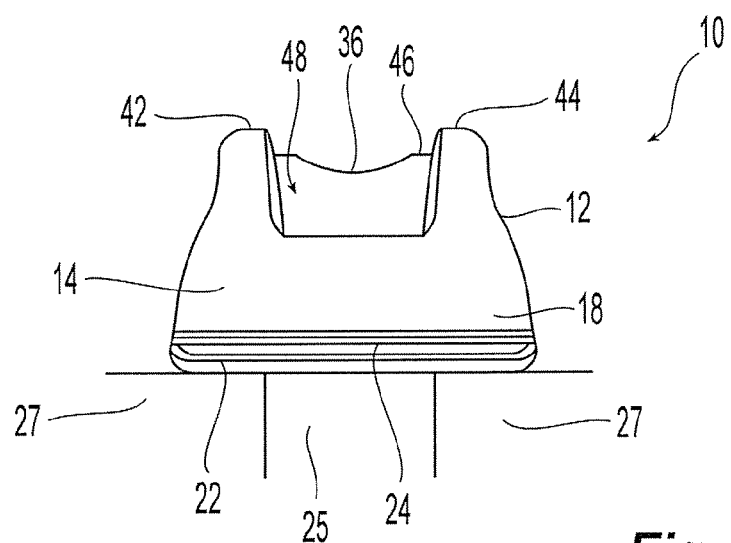
FIG. 9 shows a further end view of the clamp head.

The distal end 18 of the reaction arm 14 is rounded and is provided with a plurality of ridges 22. The ridges 22 are interspersed between respective troughs 24. The ridges 22 and troughs 24 extend transversely across the distal end 18 of the reaction arm 14 and partially around the rounded end of the reaction arm 14 in the region of the lower side 30 of the body 12. The crowns of the ridges 22 may be considered to constitute reaction faces of the clamp 10 as, in use, the crowns rest against a reaction surface as will be described below. The ridges 22 and troughs 24 extend fully across the distal end 18 of the reaction arm 14. As such, the distal end 18 of the reaction arm 14 can bridge slots or apertures 25 (see FIG. 9) of a surface 27 upon which reaction arm rests, with the opposing ends of the ridges 22 and troughs 24 engaging the surface 27.

Figure 2:
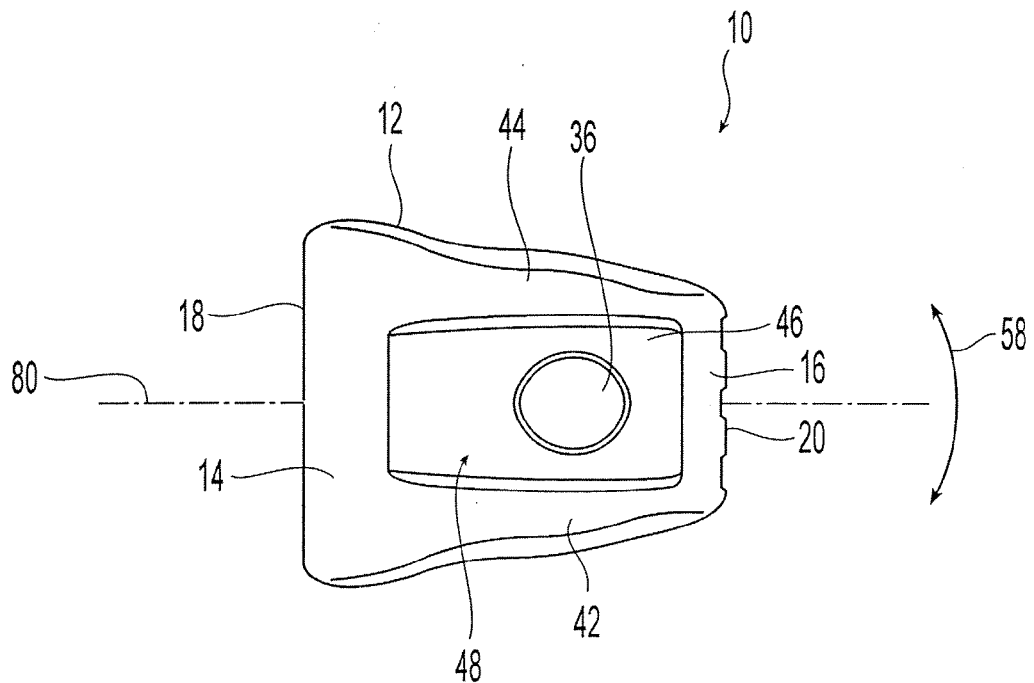
FIG. 2 shows a top plan view of the clamp head.
Figure 3:
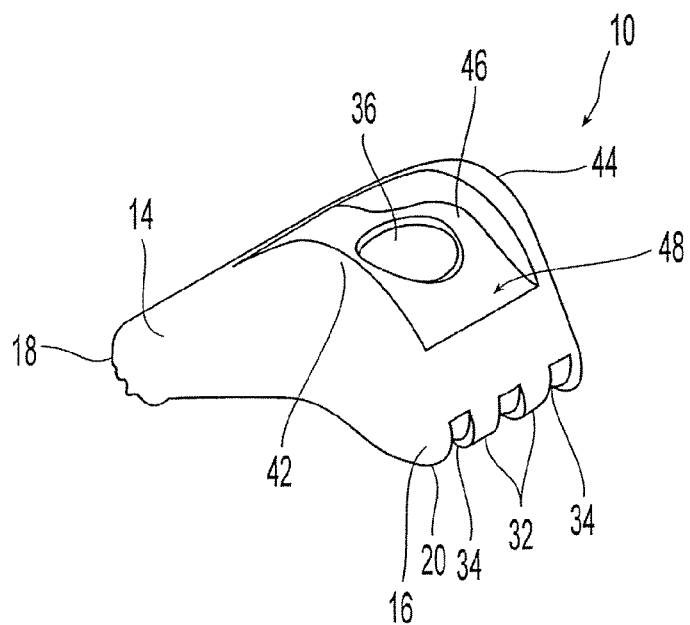
FIG. 3 shows a further perspective view of the clamp head.
Figure 4:
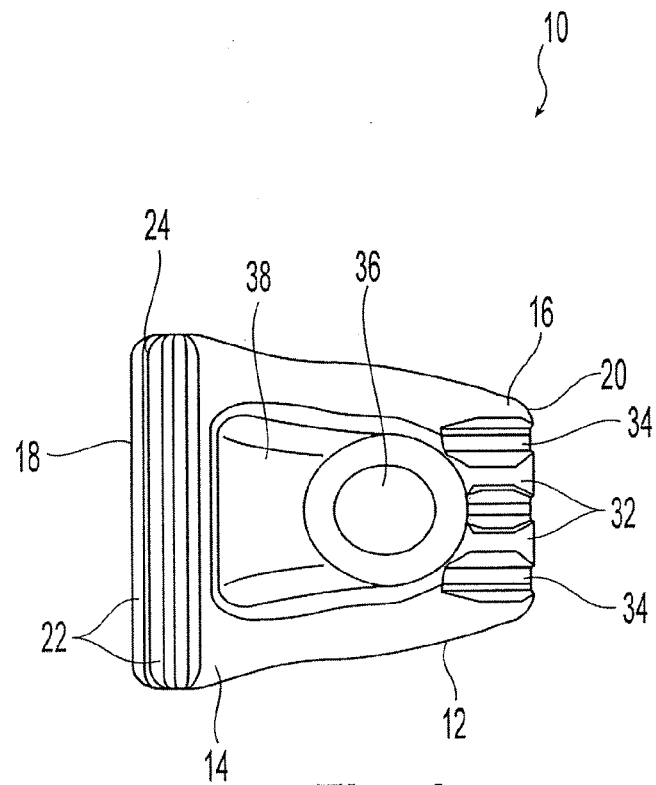
FIG. 4 shows a bottom plan view of the clamp head.
Figure 5:
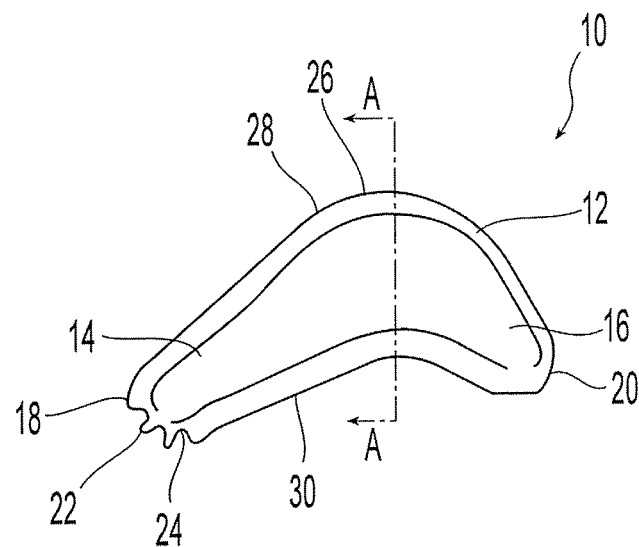
FIG. 5 shows a side view of the clamp head.
Figure 6:
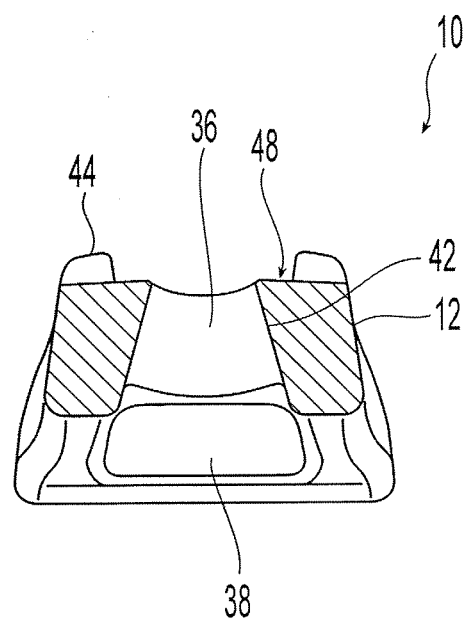
FIG. 6 shows the cross-sectional view indicated by arrows A-A of FIG. 5.
Figure 7:
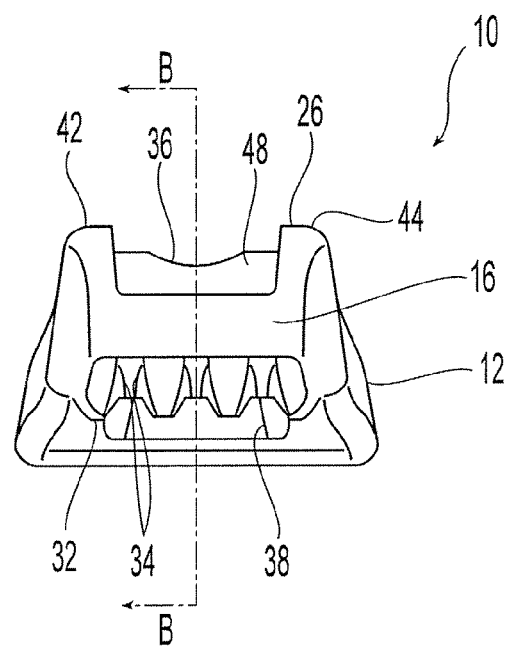
FIG. 7 shows an end view of the clamp head.
Figure 8:
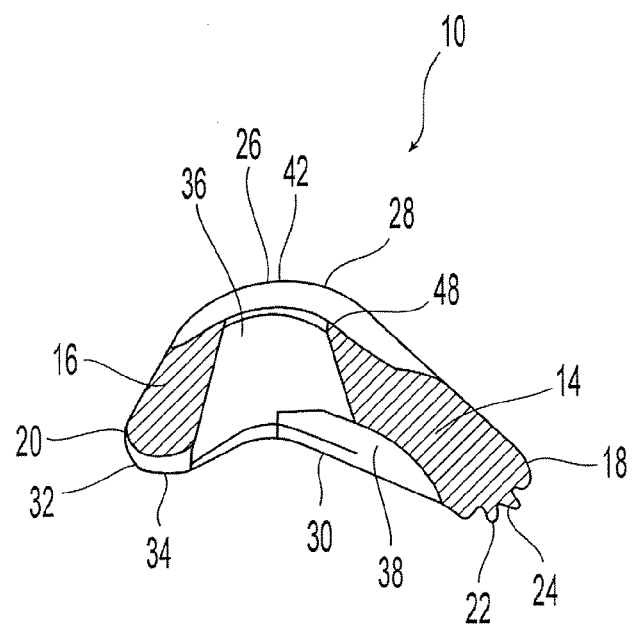
FIG. 8 shows the cross-sectional view indicated by arrows B-B of FIG. 7.

The distal end 20 of the clamping arm 16 is also rounded and provided with a plurality of teeth 32. The teeth 32 are interspersed by spaces 34. The teeth 32 and spaces 34 are aligned with the longitudinal axis 80 of the body 12 such that the ridges 22 and troughs 24 of the reaction arm 14 extend in a direction which is substantially perpendicular to that of the teeth and spaces 32,34. The crown surfaces of the teeth 32 may be considered to constitute clamping faces of the clamp 10 as, in use, the crown surfaces rest against a clamping surface as will be described in greater detail below. The ridges 22 and teeth 32 additionally, in use, resist rotation of the clamp head 10 as indicated by arrow 58 of FIG. 2, The body 12 is further provided with a through aperture 36 which extends through the body 12 between the upper and lower sides 28,30. As can be seen from the cross-sectional views, the aperture 36 tapers outwardly in the direction of the lower side 30 of the body 12. The aperture 36 is not circular, but instead is oval. The lower side 30 of the body 12 is further provided with a recess 38 which extends between the reaction arm side of the aperture 36 and the distal end 18 of the reaction arm 14. The upper side 28 of the body 12 is further provided with a recess 48 around the upper side end of the aperture 36 and over the vertex 26 of the arch. The recess 48 does not extend fully over the length or width of the body and as such a longitudinally extending curved wall 42,44 is provided upon either side of the aperture 36. The walls 42,44 are equidistantly spaced and the spacing is such that they are able to receive opposed flats of a hexagonal bolt head or nut therebetween. It will be appreciated that the underside of the bolt head or nut will rest against the floor 46 of the recess 48.

The presence of the recess 48 on the upper side 28 of the body 12 is optional. Where a recess 48 is provided in the upper side 28 of the clamp head 10, and the installation requirements of the clamp head 10 specify that a recess 48 not be provided, then a curved insert (not shown) conforming to the shape and size of the recess 48 may be utilised to "fill in" the recess 48. The insert is provided with a through aperture which aligns with the aperture 36 of the body 12.

Figure 10A:
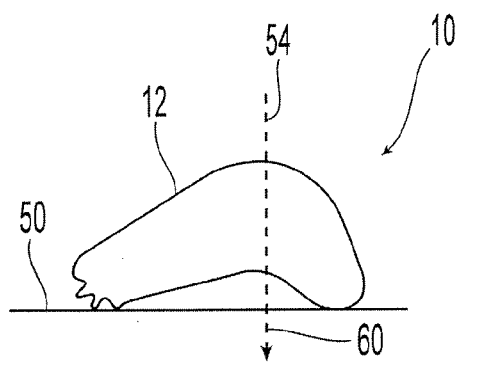
FIGS. 10a and 10b show side views of the clamp head relative to a clamping surface.
Figure 10B:
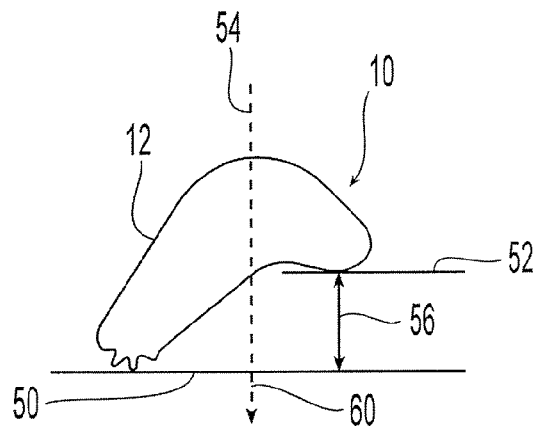

Referring now to FIGS. 10a and 10b, the clamp head 10 is shown resting upon a reaction surface 50. In FIG. 10a both the reaction arm 14 and the clamping arm 16 rest upon the reaction surface 50. In FIG. 10b, the reaction arm 14 rests upon the reaction surface 50, while the clamping arm 16 rests upon a clamping surface 52. Broken lines 54 indicate the centreline of a fastener, such as a bolt, passing through the aperture 36 of the clamp head. It will be understood that force applied to the clamp head 10 through the fastener as indicated by arrows 60 is transmitted to the reaction and clamping surfaces 50,52 through the reaction and clamping arms 14,16. The oval shape of the aperture 36 in the upper side 28 of the body 12, together with the outwardly tapering shape of the aperture 36 through the body 12 in the direction of the lower side 30 ensures that the shank of the bolt does not come into contact with the interior surface of the aperture 36. This enables the clamp head 10 to accommodate a range of clamping distances, which is to say the distance between the reaction surface 50 and the clamping surface 52 as indicated by arrow 56. The ridges 22 and teeth 34 of the arms 14,16 are configured and shaped such that they are able to contact the surfaces 50,52 throughout the range of clamping distances achievable by a given clamp head 10. The clamp head 10 of the present invention can this be utilised for a range of clamping distances where previously, a range of different clamp heads would need to be provided.

Figure 11:
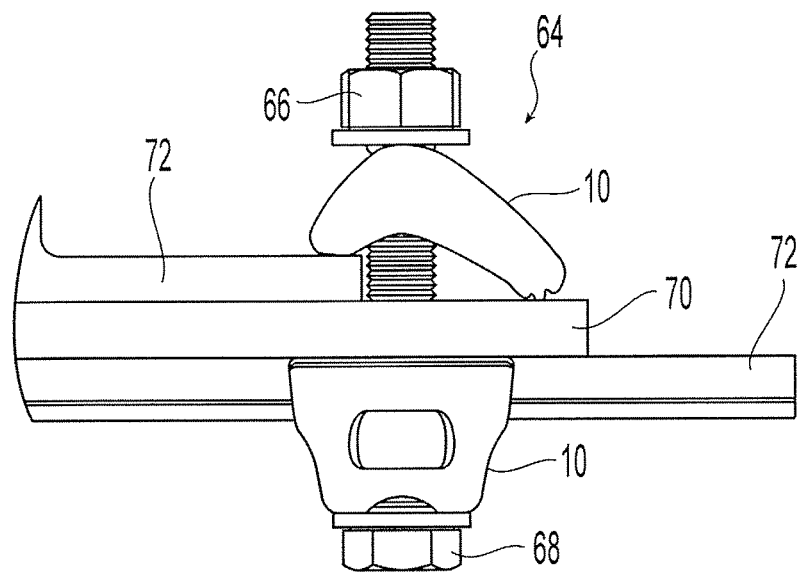
FIG. 11 shows a side view of a clamp arrangement incorporating two clamp heads according to the present invention.
Figure 12:
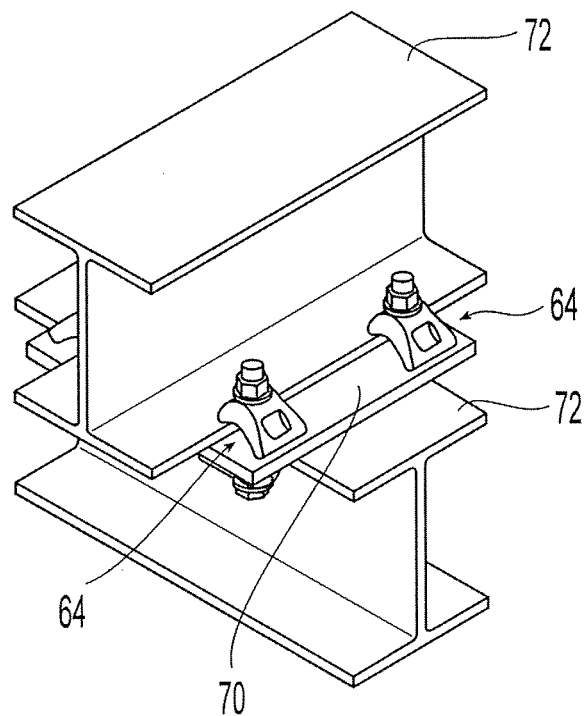
FIG. 12 shows four clamping arrangements positioned so as to clamp two structural steelwork elements to one another.

FIGS. 11 and 12 show a plurality of clamp arrangements, generally designated 64, having two clamp heads 10 joined by a nut and bolt 66,68. The clamp heads 10 are of the type without the recess 48 in the upper surface 28. The clamp arrangements 64 are mounted to a plate 70 which is provided between two "I" section beams 72. The clamp heads 10 are arranged such that the clamping arms 16 rest against flanges of the beams 72, while the reaction arms 14 rest against the plate 70.

Figure 13:
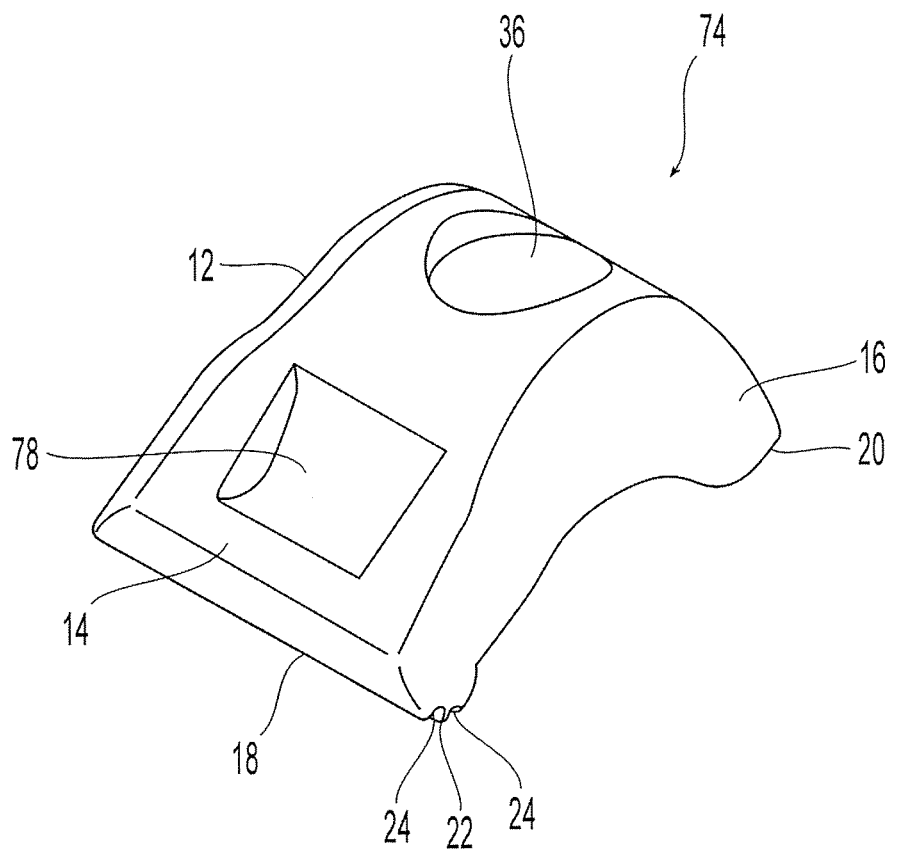
FIG. 13 shows a perspective view of an alternative embodiment of a clamp head according to the present invention.
Figure 14:
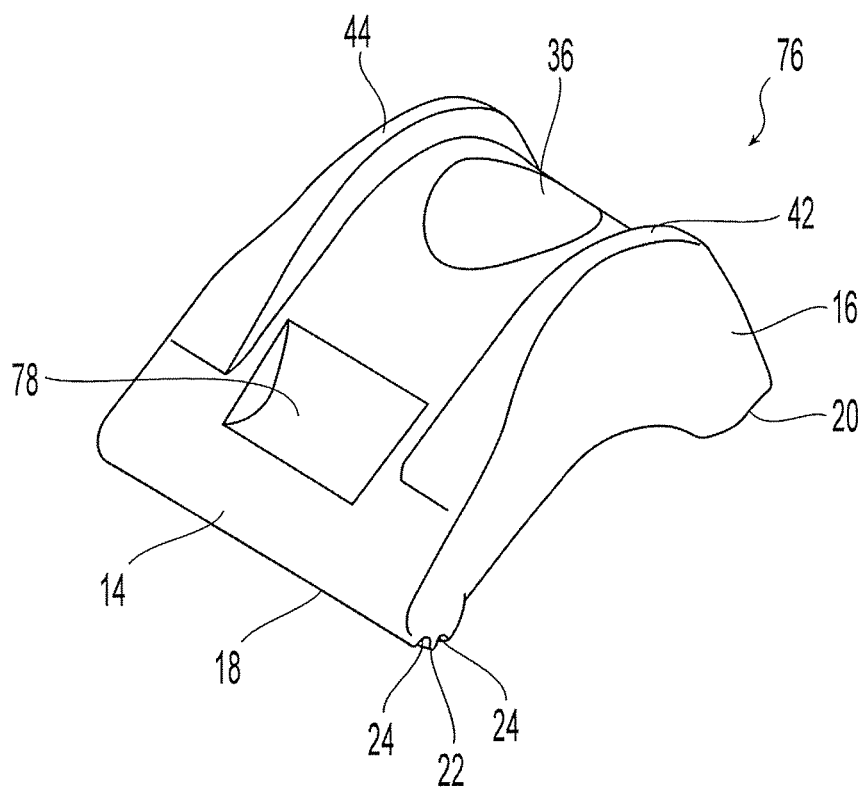
FIG. 14 shows a perspective view of a further alternative embodiment of a clam head according to the present invention.

FIGS. 13 and 14 show alternative embodiments of a clamp head according to the present invention and designated 74 and 76 respectively. Features common to the clamp 10 described with reference to FIGS. 1 to 10b are identified with like reference numerals. The body 12 of the clamp head 74 is shown with a substantially smooth upper side 28. The clamp head 74 is provided with a small recess 78 in on the reaction arm 14, but does not have the longer recess 48 or walls 42,44 of the clamp described with reference to FIGS. 1 to 10b. The clamp head 76 of FIG. 14 is provided with the walls 42,44 but not the longer recess 48 of the clamp described with reference to FIGS. 1 to 10b.

The invention claimed is:

1. A clamp head comprising an arched body having upper and lower faces, a vertex and opposing unequal length arms, the body further having a through aperture for a bolt or like threaded fastener extending between the upper and lower faces in the region of the vertex, the aperture in the upper face being oval and tapering outwardly through the body in the direction of the lower face, wherein the arms comprise a reaction arm having at its distal end a reaction portion and a clamping arm having at its distal end a clamping portion, the reaction and clamping portions having formations formed therein and thereby being provided with respective integral formations, and wherein the formations of the reaction arm extend in a direction which is substantially perpendicular to the direction of the formations of the clamping arm, wherein the reaction portion of the reaction arm is rounded and the formations of the reaction arm comprise at least one ridge and at least one trough which extend across the reaction portion of the reaction arm from one side of the reaction arm to the other, and wherein the formations of the clamping portion of the clamping arm comprise a plurality of teeth.

2. A clamp head as claimed in claim 1 wherein the formations of the reaction arm extend in a direction substantially perpendicular to the direction of the formations of the clamping arm.

3. A clamp head as claimed in claim 1, wherein the formations of the reaction arm extend in a direction substantially transverse to a longitudinal axis of the clamp head.

4. A clamp head as claimed in claim 3 wherein the formations of the clamping arm extend in a direction substantially parallel to a longitudinal axis of the clamp head.

5. A clamp head as claimed in claim 1, wherein the reaction arm is longer than the clamping arm.

6. A clamp head as claimed in claim 1, wherein the reaction arm widens in the direction of the distal end of the reaction arm.

7. A clamp head as claimed in claim 1, wherein the clamping arm narrows in the direction of the distal end of the clamping arm.

8. A clamp head as claimed in claim 1, wherein the reaction arm widens in the direction of the distal end of the reaction arm and the clamping arm narrows in the direction of the distal end of the clamping arm.

9. A clamp head as claimed in claim 8 wherein the distal end of the clamping arm is narrower than the distal end of the reaction arm.

10. A clamp head as claimed in claim 1 wherein the reaction arm is provided with a plurality of ridges and troughs.

11. A clamp head as claimed in claim 10 wherein the plurality of ridges and troughs are spaced around the rounded reaction portion.

12. A clamp head as claimed in claim 1 wherein the upper surface of the body is adapted to capture the flat sides of a nut or bolt head to prevent rotation thereof.

13. A clamp head as claimed in claim 12 wherein the upper face of the arched body in the region of the vertex and through aperture is provided with abutments for engagement with a flat side of a nut or bolt.

14. A clamp head as claimed in claim 13 wherein the upper face of the arched body is recessed between said abutments.

15. A clamp arrangement including a first clamp head according to claim 1, the clamp arrangement having an elongate threaded fastener extending through the through aperture of the clamp head.

16. A clamp arrangement as claimed in claim 15 wherein the clamp arrangement includes at least a second clamp head according to claim 1, said second clamp head being provided on the elongate threaded fastener and opposing the first clamp head.

17. A clamp head, comprising:
a clamp body joining a first end of the clamp head to a second end of the clamp head, the clamp head having opposing first and second arcuate surfaces defining first and second sides of the clamp head, the first end being rounded and having first formations formed therein and thereby being provided with integral ridges projecting from the first side of the clamp head and the second end having second formations formed therein and thereby being provided with integral teeth projecting from the first side of the clamp head, the first and second arcuate surfaces defining an aperture extending through the clamp body between a first vertex of the first arcuate surface and a second vertex of the second arcuate surface and defining an aperture direction, the ridges extending in a first direction orthogonal to the aperture direction, the teeth extending in a second direction orthogonal to the aperture direction, the first direction perpendicular to the second direction.

18. A clamp, comprising:
a first and second clamp bodies, each clamp body having a first rounded clamping end and a second clamping end, the first and second clamping ends having formations formed therein and thereby being provided with integral ridges and integral teeth respectively, the direction of the integral ridges and the direction of the integral teeth being substantially perpendicular to each other, each of the first and second clamp bodies having opposing arcuate surfaces extending between the first and second clamping ends, the opposing arcuate surfaces defining an aperture extending through each clamp body; and a joining member extending through the apertures of the first and second clamp bodies, the aperture of the first clamp body having an inner dimension that increases in a direction towards the second clamp body, and the aperture of the second clamp body having an inner dimension that increases in a direction towards the first clamp body.

19. A method of clamping two elements together, comprising:
positioning a joining member defining an longitudinal axis to dispose a first end of the joining member near a first surface of one of the two elements and to dispose a second end of the joining member near a second surface of the other of the two elements;

disposing a first clamp body at the first end of the joining member to position integral ridges against the first surface in a first direction orthogonal to the axis and to position integral teeth against the first surface in a second direction orthogonal to the axis and transverse to the first direction; and disposing a second clamp body at the second end of the joining member to position integral ridges against the second surface in a third direction orthogonal to the axis and to position integral teeth against the second surface in a fourth direction orthogonal to the axis and perpendicular to the third direction.

* * * * *